United States Patent [19]

Doble

[11] Patent Number: 4,762,268
[45] Date of Patent: Aug. 9, 1988

[54] FABRICATION METHOD FOR LONG-LENGTH OR LARGE-SIZED DENSE FILAMENTARY MONOTAPES

[75] Inventor: Gordon S. Doble, Shaker Hts., Ohio

[73] Assignee: Airfoil Textron Inc., Lima, Ohio

[21] Appl. No.: 858,623

[22] Filed: May 2, 1986

[51] Int. Cl.$^4$ ............................................. B23K 31/02
[52] U.S. Cl. .................................. 228/186; 228/190; 29/155 R
[58] Field of Search ............ 228/186, 190, 173.6, 228/173.7, 175, 265; 29/445, 517, 155 R

[56] References Cited

U.S. PATENT DOCUMENTS

| | | | |
|---|---|---|---|
| 2,753,623 | 7/1956 | Boessenkool et al. | 228/175 X |
| 2,782,497 | 2/1957 | Campbell | 228/186 X |
| 3,164,884 | 1/1965 | Noble et al. | 228/186 X |
| 3,349,537 | 10/1967 | Hopfeld | 29/155 R X |
| 3,443,301 | 5/1969 | Basche et al. | 29/419 |
| 3,551,996 | 1/1971 | Sumner et al. | 228/190 |
| 3,553,820 | 1/1971 | Sara | 29/419 |
| 3,600,103 | 8/1971 | Gray | 228/190 X |
| 3,606,667 | 9/1971 | Kreider | 29/423 |
| 3,795,042 | 3/1974 | Kreider et al. | 29/ |
| 3,886,647 | 6/1975 | Alexander | 228/175 |
| 3,900,150 | 8/1975 | Delgrosso et al. | 228/185 |
| 3,984,043 | 10/1976 | Kreider et al. | 228/190 |
| 3,991,928 | 11/1976 | Friedrich et al. | 228/190 |
| 4,010,884 | 3/1977 | Rothman | 228/190 |
| 4,020,542 | 5/1977 | Slaughter | 29/155 R X |
| 4,115,611 | 9/1978 | Stoltze et al. | 428/ |
| 4,260,441 | 4/1981 | Prewo | 156/166 |

FOREIGN PATENT DOCUMENTS

| | | | |
|---|---|---|---|
| 84119 | 7/1981 | Japan | 228/265 |
| 470379 | 8/1975 | U.S.S.R. | 228/190 |

Primary Examiner—Nicholas P. Godici
Assistant Examiner—Carmine Cuda
Attorney, Agent, or Firm—Edward J. Timmer

[57] ABSTRACT

A method for fabricating long-length and/or large-sized dense filamentary reinforced monotapes. The method comprises forming a layered sandwich of matrix foils or encapsulating sheets plus foils around a reinforcing mat of collimated fibers and sealing the edges of the assembly. The sealing step is carried out with the sandwich formed to a predetermined arcuate configuration such that the sandwich can be coiled after edge sealing without buckling the encapsulating sheets or disturbing the filament alignment and orientation. The formation of the sealed, encapsulated preform can be carried out using continuous processing techniques. Subsequent processing, such as densification, can be performed with the preform in the coiled condition or after it is uncoiled to approximately the arcuate configuration of the sealing step.

19 Claims, 3 Drawing Sheets

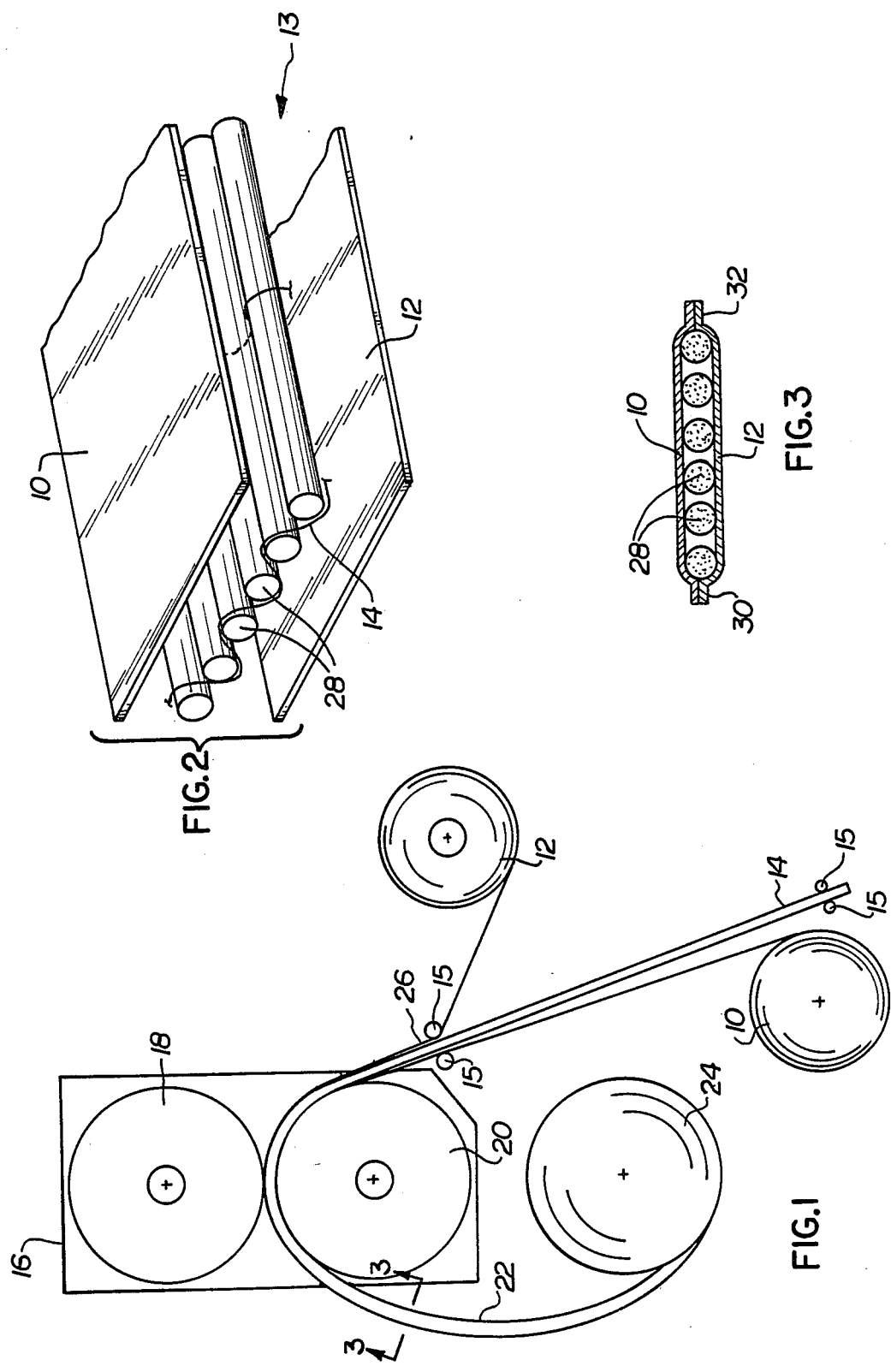

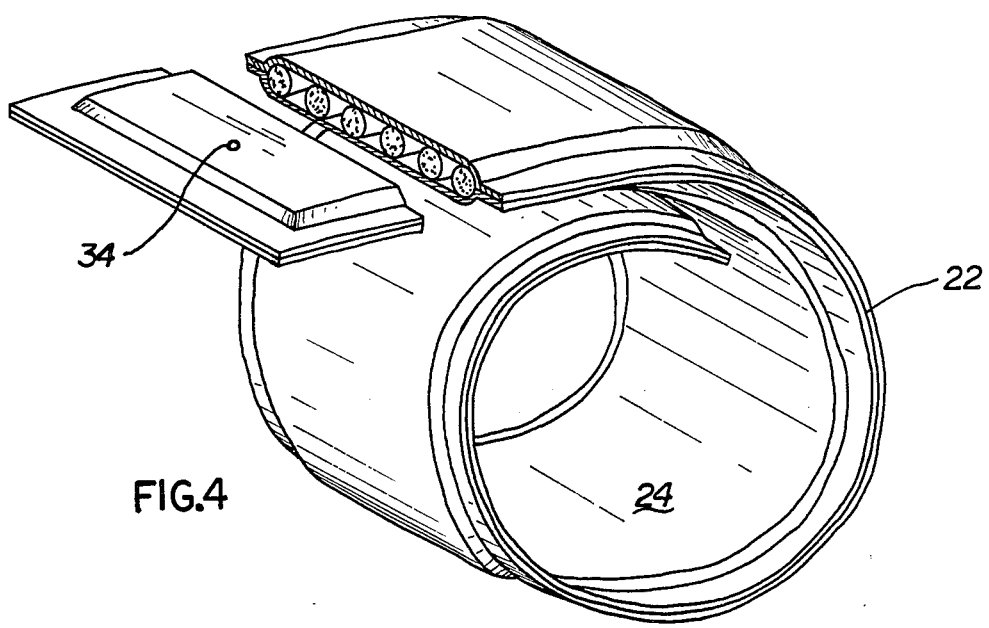
FIG.4
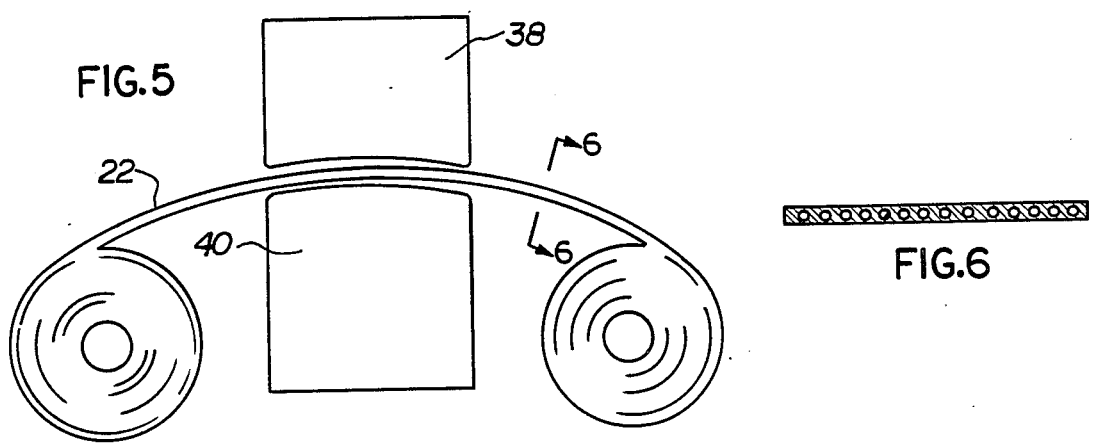
FIG.5
FIG.6
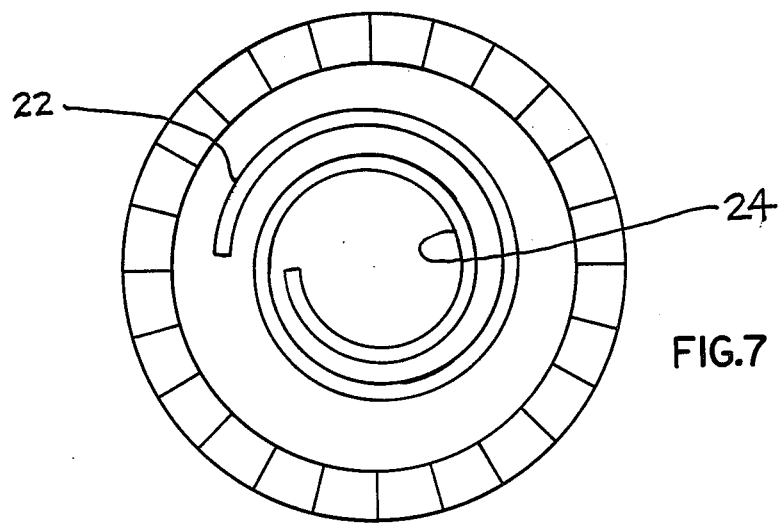
FIG.7

FABRICATION METHOD FOR LONG-LENGTH OR LARGE-SIZED DENSE FILAMENTARY MONOTAPES

BACKGROUND OF THE INVENTION

The present invention relates to fully dense filamentary reinforced monotapes and more particularly to a method of producing long-length or large-sized monotapes.

High modulous, high strength metal matrix composites have become increasingly important in the fabrication of parts such as blades, disks and spacer rings, for steam or gas turbine engines, propellers, and a wide variety of other special applications in both the aerospace and other industries. In general, these monotapes exhibit ansiotropic strength characteristics, which generally include high stiffness, high strength, and low density. The strength and the stiffness are directly related to the high tensile strength of the reinforcing filaments and are therefore substantially greater in the direction parallel to the plane in which the majority of the filaments are aligned.

The specific details of monotapes and their fabrication processes may vary from manufacturer to manufacturer, however, in general the monotape consists of a sandwich of one or more layers of collimated fibers or reinforcing filaments positioned in a metal alloy matrix material. The reinforcing filaments are generally in the form of a "mat" prealigned in a single plane, carefully spaced parallel to each other, with very widely spaced metal ribbons, a binder, or perpendicular cross wires, typically as illustrated in FIG. 1 of U.S. Pat. No. 4,260,441. The sandwich of filaments and matrix material is subjected to a high temperature, a high pressure compacting procedure, usually either hot isostatic pressing or press diffusion bonding, to produce the compacted monotape.

The overall strength characteristics of the monotape will, of course, be primarily a function of the high strength reinforcing filaments employed. These typically include materials such as filaments of boron, boron coated with silicon carbide or boron carbide, silicon carbide, ceramics such as alumina, and refractory metals such as tungsten and molybdenum. Typical matrix alloys are aluminum, magnesium, titanium, iron-base superalloys, nickel-base superalloys, and intermetallic compounds such as titanium aluminide. Many of the more useful combinations of filament and matrix undergo reaction between the filament and the matrix if excessive temperatures are encountered during fabrication. This interaction may produce a degradation of mechanical properties. To avoid this loss of properties, the fabrication parameters employed tend to use relatively high unit pressures at the minimum practical temperatures. In the past this has effectively limited the size of the monotape to an overall surface area of less than about one square foot and often to less than about 0.5 square feet, i.e., the area of a tape which could be accommodated between the platens of a press or within the cavity of a hot isostatic pressing device. Larger sizes of monotapes may be produced by sequential pressing together of shorter lengths, but the filament alignment in uncompacted areas next to the area being pressed is frequently disturbed and may result in lower values of stiffness and strength. The time required to produce very long or very large monotapes by the sequential press bonding of shorter lengths increases directly with the required number of steps.

It has been known that to employ alloys, which react under heat and pressure, as the matrix of filament, it was necessary to seal the sandwich in an encapsulator and either evacuate the air, or inject an inert atmosphere, prior to the the step of compacting or densification.

Another problem encountered in the prior art involved attempts to subject the sandwich to a series of sequential pressing steps. It was found that the uncompacted tape had to be maintained in a substantially flat, unbent configuration because the encapsulator matrix foil and collimated filaments are relatively rigid. Consequently, if one desired to produce a ten foot long monotape, the production area had to be large enough to accommodate the uncoiled lengths on either side of the press.

Monotapes of the type contemplated by the present invention may be used to form an end product of a predetermined size and configuration, for example, very long narrow monotapes tightly coiled to form a ring or disk. The ultimate end product is formed from either a single or plurality of monotapes which are layered one over the other until the desired number of plies are present, after which the stack of monotape plies are subject to suitable forming techniques under high temperature and pressure during which the individual monotapes are in essence molded and bonded to each other and formed into the desired final configuration.

The advantage of the invention is to produce monotapes containing very long or continuous filaments for maximum strength. Monotapes of the type contemplated by the present invention may also be sectioned into a large number of smaller plies and used for a product such as a gas turbine blade. The advantage of the invention in such case is an economical method for manufacturing monotapes.

Depending upon the desired end use of the part to be formed from the monotapes, the individual monotapes may be piled one upon the other with all of the reinforcement filaments in a single parallel axis, or if desired, the filaments of one or more of the monotapes may be perpendicular to, or at an angle bias to, the axis of the reinforcing filaments in the plies above or below it.

Where the parts to be formed are wider or longer than the size of monotapes heretofore available, monotapes were generally put together very much like the layers of bricks in a building, with the joints in any given ply being offset from those in the ply above and below it. Such fabrication techniques produced a product in which the overall strength of the pieced together tapes was substantially less than could have been obtained if each monotape ran the entire length of the part. The advantage of the invention in such circumstance is to provide a monotape which may be employed without splicing or at least with a minimum of splicing.

BRIEF DESCRIPTION OF THE INVENTION

According to the subject invention it is possible to make long length and/or large size fully dense filamentary reinforced monotapes of high quality without the manufacturing space requirements, handling problems, and high cost present when using prior art methods. In accordance with the present invention, a collimated filament preform is captured between encapsulating sheets of matrix material. The sandwich of collimated filament preform and matrix material encapsulating sheets is deformed to a predetermined arcuate configuration and, while in the arcuate configuration, the edges of the encapsulating sheets are joined and sealed, preferably by welding such as electron beam welding.

Because the sandwich is edge joined and sealed while in an arcuate configuration, it can be coiled to a radius somewhat less than the radius at which the joining took place. The assembly can then be conveniently compacted while in the coiled form, such as by hot isostatic pressing, or uncoiled and compacted by press diffusion bonding using a press having platens conforming substantially to the curvature imparted during the edge joining operation.

Since the starting materials, the encapsulated assembly, and the resulting fully dense monotape can be in a coiled form, the total floor space required, as well as, the size of the handling and processing equipment can be much less than required by prior art forming techniques for producing a filamentary reinforced monotape of the same size. The entire assembly may also be consolidated during a single cycle by hot isostatic pressing.

In accordance with a further aspect of the invention, the encapsulated assembly can be evacuated and sealed, or provided with an evacuation tube for maintaining a dynamic atmosphere during consolidation. This allows long length or large size monotapes to be made using conventional presses.

The monotape formed by the process of the present invention may be left coiled, or warm straightened if desired, and can then be formed into end products using one or more monotape plies in a conventional manner.

In general, the monotapes of the present invention can have a width of up to about 10 feet, a length of up to about 50 feet or more, and have seams edge-welded while imparting a curvature corresponding to a radius of from about 6 inches to about 30 inches. It will be appreciated that the sizes will be determined by the availability of woven filament mat and hot isostatic pressing vessels.

A principal object of the invention is the provision of a method for forming fully dense filamentary reinforced monotapes in long lengths and/or large sizes.

Another object resides in the provision of a method of the type described which can be used to produce long length or large size monotapes with reactive matrix materials.

A still further object of the invention is the provision of a method wherein an encapsulated assembly of a collimated filament preform and matrix can be coiled and consolidated while in the consolidated form or partially uncoiled and consolidated.

BRIEF DESCRIPTION OF THE DRAWINGS

The invention may take form in certain parts and arrangements of parts, preferred and alternative embodiments of which will be described in this specification and illustrated in the accompanying drawings which form a part hereof and wherein:

FIG. 1 is a diagrammatic illustration of the manner of forming the sandwich prior to compaction;

FIG. 2 is an exploded view of the elements being brought together to form the sandwich;

FIG. 3 is a cross-sectional view of the sandwich after welding of the edges of the foil;

FIG. 4 is a fragmented view of the sandwich in coiled form prior to compaction;

FIG. 5 illustrates one method of compacting the sandwich to form a monotape;

FIG. 6 is a cross-sectional view of the monotape after compacting;

FIG. 7 illustrates one of the alternative methods of compacting the sandwich to form the monotape;

DETAILED DESCRIPTION OF PREFERRED EMBODIMENT

Figure 8:
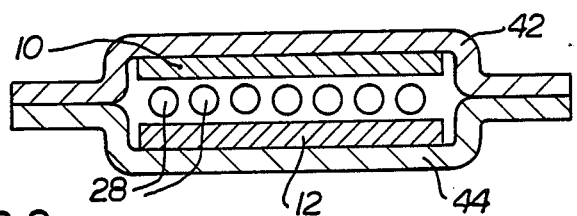
FIG. 8 is a cross-sectional view of an embodiment employing a separate encapsulator layer.

Referring now to the drawings wherein the showings are for purposes of illustrating preferred and alternative embodiments of the invention only, monotapes of from about 2 to about 50 feet in length are produced in the preferred arrangement by continuously feeding layers of foil and reinforcing monofilaments to form a sandwich, passing the assembled foil layers and reinforcements through an edge welding apparatus having curved welding dies with a curvature of from about 6" to about 12". Such an embodiment is illustrated in FIGS. 1-4.

FIG. 1 is a diagrammatic illustration of the present invention. Two rolls of suitable foil matrix material 10 and 12 and a reinforcing filament mat 14 are fed through suitable guide means shown in the form of rollers 15 to a welding device 16 having curved upper and lower elements 18 and 20 to form a curved edge welded sandwich 22 which is taken up on suitable roller means to form sandwich roll 24. The type of welding device used depends, to some extent, upon the matrix material; however, when the matrix sheets or foils are aluminum, titanium, iron or nickel alloy, the welding device 16 can be a conventional seam welder.

FIG. 2 is an exploded view of the elements of FIG. 1 coming together prior to welding of the edges in device 16 about the point generally indicated by 26 in FIG. 1. As shown in FIG. 2, reinforcing filament mat identified generally as 13 (illustrated as a plurality of longitudinal reinforcing fibers 28) as disposed between the two layers of the matrix foil 10 and 12. The longitudinal fibers 28 are intertwined with transversely extending wire or ribbon 14 that goes over-under adjacent fibers.

FIG. 3 is a cross-sectional view on the line 3—3 of FIG. 1 of the sandwich 22, again illustrating foil layers 10 and 12, the plurality of reinforcing filaments 28, and edge welds indicated as 30 and 32. FIG. 4 is a fragmented view of the entire sandwich after completion of the operations illustrated in FIG. 1 and in particular showing a port 34 which can be employed to purge any reactive atmosphere from the interior of sandwich 22 either by evacuation, or by flushing with an inert gas. It will be understood that while only one port is shown other ports may be at opposite ends of the sandwich.

FIG. 5 illustrates the compacting of the sandwich into a monotape using press diffusion bonding techniques and in particular a high pressure, high temperature press having platens 38 and 40 with a curved surface which generally corresponds to the curvature of roll 24 of sandwich 22. FIG. 6 is a cross-sectional view on the line 6—6 of FIG. 5, showing the compacted monotape after densification. FIG. 7 is a diagrammatic illustration of an alternative compacting procedure in which roll 24 of sandwich 22 is placed into a hot isostatic pressing device which is operated in the conventional manner to compact the sandwich, and form a monotape having substantially the same cross-section as that illustrated in FIG. 6.

It will be appreciated that in some cases the sandwich formed (prior to compaction) with the thin foils alone may not be strong enough to undergo the compaction step and still maintain a sealed air tight monotape. To overcome the difficulties encountered with a fragile sandwich it is another feature of this invention to employ an encapsulation material, such as, for example, stainless steel, or plain carbon steel usually in a thickness of from about 0.010 inches to about 0.037 inches. Such an embodiment is illustrated in FIG. 8, showing reinforcement fibers 28 between foil layers 10 and 12, which are, in turn, sandwiched between encapsulating layers 42 and 44. Where a separate encapsulating layer is employed, due care must be given to choose a material which can be etched, dissolved away, or otherwise removed without disturbing the underlying foil monotape. When desired or necessary, a thin separator layer may be disposed between the foil and the encapsulator.

In the description thus far the sandwich has been formed with outer layers of foil. It is contemplated that in place of thin foils the outer layers or matrix alloy may be applied directly to the reinforcing filament mat by a plasma or arc spraying process.

Figure 9:
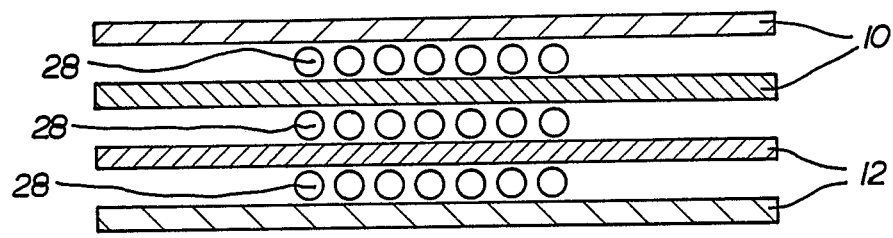
FIG. 9 is a cross-sectional view of an alternative embodiment in which a plurality of foil layers and reinforcing mats are employed; and, FIG. 10 is a cross-sectional view of the embodiment of FIG. 9 after edge welding of the sandwich.
Figure 10:
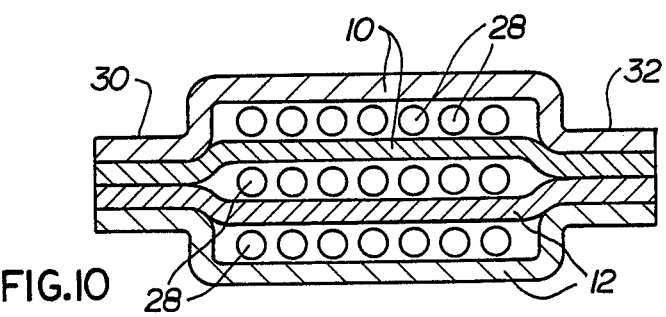
Figure 11:
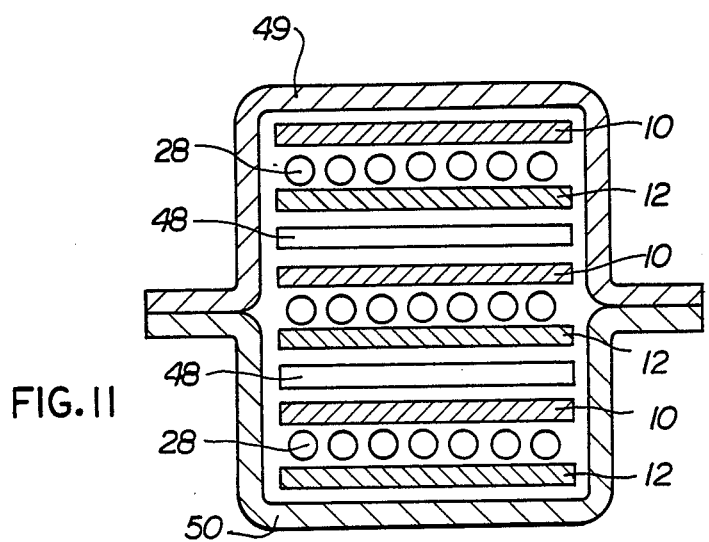
FIG. 11 is a cross-sectional view of an alternative embodiment in which a plurality of individual monotapes are encapsulated in an overall sandwich with separators between each monotape.

FIGS. 9 and 10 illustrate yet another embodiment of the present invention in which a plurality of foil layers 10, 12 and filament reinforcing mats 28 are formed into a multi layer sandwich. The embodiment of FIGS. 9 and 10 may also employ a separate outer encapsulating layer such as illustrated in FIG. 8. Indeed, when such separate encapsulating layers 45 and 47 are employed, it may also be possible to produce a plurality of individual monotapes from a single encapsulated overall sandwich, as illustrated in FIG. 11. In such an embodiment, a plurality of foil-filament-foil elements, such as shown in FIG. 1, are layered one on top of the other, with a separator 48 between each set of elements and encapsulated between layers 49 and 50. In each of the embodiments represented by FIGS. 8 through 11 it is, of course, understood that the edge sealing operation is carried out with the sandwich in the predetermined arcuate condition as described with reference to the FIGS. 1 through 4. After the overall sealed sandwich is compacted, the encapsulating material 42, 44, 45, 47, 49 and 50 is etched or dissolved away, as described above, and the individual compacted monotapes are separated by being peeled from each other, or by dissolving away the separator, or the like.

As examples of foils or matrix materials which can be employed mentioned may be made of alloys of:

| | |
|---|---|
| Aluminum | Magnesium |
| Titanium | Iron Base Superalloys |
| Nickel Base Superalloys | Titanium Aluminide |
| Nickel Aluminide | Tantalum |
| Columbium | Molybdenum |

In general foils having a thickness of from about 0.0015 inch to about 0.008 inch are most commonly used in the practice of the present invention, though thinner or thicker foils can, of course, be employed.

As examples of reinforcing fibers or fiber mats which can the following having proved advantageous:

| | |
|---|---|
| Steel | Boron |
| Coated Boron | Silicon Carbide |
| Alumina | Alumina-Silica |
| Tungsten | Molybdenum |

In general fibers having a diameter of from about 0.004 inch to about 0.015 inch are most commonly employed in fabricating monotapes of the type contemplated by the present invention, though again, thinner or thicker fibers can be employed.

When the matrix alloy is to be plasma sprayed, it is usually desirable to have a particle size less than 200 mesh while where they are arc sprayed, a wire size of from about 1/32 inch to about ⅛ inch is preferred.

As examples of separators which may be employed in the practice of the present invention, mention may be made of carbon steel, molybdenum, or stainless steel. The separators may be covered with a compound to present sticking compounds such as graphite, boron nitride, or various oxides are commonly used.

In general such separators have a smooth surface finish; they are low cost if intended for use only once; they are strong enough at the consolidation condition to avoid indenting and have thermal expansion properties close to that of the composite.

The following specific example will describe the practice of the present invention.

A woven filament mat consisting of 5.7 mil diameter fibers of boron coated with silicon carbide, woven together with a titanium ribbon cross-strip, at a filament spacing of approximately 120 filaments per inch and at a nominal size of 4-½ inches wide ×7½ feet long was placed between two layers of 0.015 inch titanium sheet, nominal 6 inches ×8 feet in size. The edges were welded together in a coiled position using a seam welder, as illustrated in FIG. 1, with electrode wheels 10 inches in diameter. The assembly after welding is shown in FIG. 3. The resulting assembly was evacuated and electron beam welded to seal. The assembly was hot isostatically pressed at 1525° F/2 hours/15,000 psi. as shown in FIG. 7. The resulting monotape after trimming is shown in FIG. 4. The maximum length of the monotape that could be produced is limited only by the maximum available length of woven filament mat and the number of layers which will fit into the hot isostatic pressing vessel. In the example described, the thickness of the welded assembly was approximately 0.040 inch. Using an 11-inch hot isostatic pressing vessel and one inch of wrap, the maximum number of layers which would fit together is 25, which would be a length of 65 feet depending upon how tightly the assembly may be coiled. Larger radii and larger hot isostatic pressing vessels could produce even longer lengths.

What is claimed is:

1. A method of forming a densified filamentary reinforced monotape including the steps of:
    (a) providing a collimated filament preform;
    (b) forming an assembly by positioning said preform between layers of matrix material;
    (c) forming a length of said assembly between tool means including forming said length of said assembly into a first predetermined arcuate configuration while sealing opposite edges of said matrix material along said length to encapsulate the collimated filament preform between said layers of said matrix material;

(d) consolidating said formed length of said assembly to form a length of densified filamentary reinforced monotape.

2. The method of claim 1 wherein step (c) includes continuously passing said length between forming and sealing tool elements constituting said tool means so as to impart said first predetermined arcuate configuration to said length and to seal said edges between said tool elements as said length passes therebetween.

3. The method as defined in claim 1 wherein said matrix material consists of metal sheets which are welded between the tool means along the lateral edges of said matrix material thereby sealing the assembly in the predetermined arcuate configuration.

4. The method of claim 1 wherein said consolidating step comprises press diffusion bonding said length of said assembly using dies having a curvature approximating said first predetermined arcuate configuration.

5. The method of claim 1 including the additional step of further imparting to said length a second arcuate configuration having a smaller radius than said predetermined arcuate configuration to form a coil of said length.

6. The method of claim 5 wherein the step of consolidating comprises hot isostatic pressing of said coil.

7. The method of claim 1 including the step of evacuating said encapsulated assembly prior to said consolidating step.

8. A method of forming a densified filamentary reinforced monotape including the steps of:

(a) providing a collimated filament preform;

(b) forming an assembly by positioning said preform between layers of matrix material;

(c) encasing said assembly in (b) between sheets of removable encapsulating material;

(d) forming a length of said assembly between tool means including forming a length of said encased assembly to a predetermined arcuate configuration while sealing opposite edges of said removable encapsulating material along said length;

(e) consolidating said length of encased assembly.

9. The method of claim 8 wherein step (d) includes continuously passing said length between forming and sealing elements constituting said tool means so as to impart said first predetermined arcuate configuration to said length and to seal said edges between said elements as said length passes therebetween.

10. The method as defined in claim 8 wherein said sheets comprises a weldable metal and the sealing step comprises welding along the length of the edges of said encapsulating material.

11. The method of claim 8 including the added step of forming the length having said predetermined arcuate configuration into a coil having a radius smaller than said predetermined arcuate configuration.

12. The method of claim 8 wherein said consolidating step comprises press diffusion bonding said length of said assembly using dies having a curvature approximately the same as said predetermined arcuate configuration.

13. The method of claim 11 including the step of consolidating said coil by the process of hot isostatic pressing.

14. The method of claim 8 including the step of evacuating said encapsulated matrix encased preform prior to said consolidating step.

15. The method of claim 8 wherein said sheets are removed from the matrix material enclosed preform after consolidating.

16. A method of forming a filamentary reinforced assembly including the steps of:

(a) providing a filament preform;

(b) forming an assembly by positioning said preform between layers of matrix material;

(c) forming said assembly into a first predetermined arcuate configuration while sealing edges of said matrix material to encapsulate the filament preform between said layers of said matrix material;

(d) imparting to said formed assembly a second arcuate configuration having a smaller radius than said first predetermined arcuate configuration to form a coil of said assembly.

17. The method of claim 16 including the additional step of consolidating the formed and sealed assembly after step (c) or the coil after step (d) to form a densified filamentary reinforced monotape.

18. A method of forming a filamentary reinforced assembly including the steps of:

(a) providing a filament preform;

(b) forming an assembly by positioning said preform between layers of matrix material;

(c) encasing said assembly in step (b) between sheets of removable encapsulating material;

(d) forming said encased assembly to a predetermined arcuate configuration while sealing the edges of said removable encapsulating material;

(e) forming said formed encapsulated assembly to another arcuate configuration having a smaller radius than said predetermined arcuate configuration to form a coil of said assembly.

19. The method of claim 18 including the additional step of consolidating the formed and sealed assembly after step (d) or the coil after step (e) to form a densified assembly.

* * * * *

UNITED STATES PATENT AND TRADEMARK OFFICE
CERTIFICATE OF CORRECTION

PATENT NO.  : 4,762,268
DATED       : August 9, 1988
INVENTOR(S) : Gordon S. Doble It is certified that error appears in the above-identified patent and that said Letters Patent is hereby corrected as shown below:

```
Column 1, line 18, delete "ansiotropic" and insert
                   --anisotropic-- therefor.
Column 5, line 34, delete "multi layer" and insert
                   --multi-layer-- therefor.
Column 6, line 36, after "4" delete -- - --.
```

Signed and Sealed this

Fifteenth Day of January, 1991

Attest:

HARRY F. MANBECK, JR.

*Attesting Officer*   *Commissioner of Patents and Trademarks*